(12) United States Patent
Ogami et al.

(10) Patent No.: US 6,520,039 B2
(45) Date of Patent: Feb. 18, 2003

(54) CONTROL DEVICE AND METHOD FOR AUTOMATIC TRANSMISSION FOR AUTOMATICALLY SHIFTING SYNCHROMESH TYPE GEAR TRANSMISSION

(75) Inventors: Shiro Ogami, Kariya; Yoshiki Ito, Aichi-ken, both of (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/865,497

(22) Filed: May 29, 2001

(65) Prior Publication Data

US 2002/0014130 A1 Feb. 7, 2002

(30) Foreign Application Priority Data

May 30, 2000 (JP) ........................ 2000-160629

(51) Int. Cl.$^7$ ................................. F16H 59/00
(52) U.S. Cl. ............................................ 74/335
(58) Field of Search .................................. 74/335

(56) References Cited

U.S. PATENT DOCUMENTS

| | | | |
|---|---|---|---|
| 4,998,443 A | 3/1991 | Janiszewski | |
| 5,233,525 A | 8/1993 | Overmann et al. | |
| 5,706,197 A | 1/1998 | Stasik et al. | |
| 5,809,835 A | 9/1998 | Beim et al. | |
| 5,816,100 A | 10/1998 | Fowler et al. | |
| 5,868,033 A | * 2/1999 | Nishino et al. | 74/335 |
| 6,336,372 B1 | * 1/2002 | Ogami et al. | 74/335 |

FOREIGN PATENT DOCUMENTS

JP   2000-130573   5/2000

* cited by examiner

*Primary Examiner*—Dirk Wright
(74) *Attorney, Agent, or Firm*—Oblon, Spivak, McClelland, Maier & Neustadt, P.C.

(57) ABSTRACT

A control device for an automatic transmission for automatically shifting a synchromesh type gear transmission, having a controller in which shifting to another gear is performed after temporary synchronization is effected by use of a synchronizer of an intermediate gear between one gear and the another gear, when shifting from the one gear to the another gear while skipping at least a next gear of the one gear is effected.

8 Claims, 13 Drawing Sheets

CONTROL DEVICE AND METHOD FOR AUTOMATIC TRANSMISSION FOR AUTOMATICALLY SHIFTING SYNCHROMESH TYPE GEAR TRANSMISSION

BACKGROUND OF THE INVENTION

1. Field of the Invention

This invention relates to a control device and method for an automatic transmission for automatically shifting a synchromesh type gear transmission.

2. Description of the Prior Art

A first conventional control device for an automatic transmission is adapted to automatically shift the gear position of a synchromesh-type gear transmission. In an exemplary case in which the gear position is shifted from fifth gear to third gear, as shown in the flowchart of FIG. 12 and the time chart of FIG. 9(A), the gear position is first shifted from fifth gear to fourth gear, and then from fourth gear to third gear.

A second conventional control device for an automatic transmission adopts a different approach for the case in which the gear position is shifted from fifth gear to third gear. That is, as shown in the flowchart of FIG. 13 and the time chart of FIG. 9(B), the gear position is shifted directly from fifth gear to third gear, while fourth gear is skipped. In other words, making use of a H-shaped shift pattern, the neutral state is detected to thereby shift the gear position to third gear in a single stroke.

When the first conventional control device for an automatic transmission sequentially effects shifting from fifth gear to fourth gear and then to third gear, a relatively light load acts on the synchronizer. However, due to an increased number of shift operations, the first conventional control device has a drawback of increased overall shift time.

When the second conventional control device for an automatic transmission effects shifting directly from fifth gear to third gear, while skipping fourth gear, the reduced number of shift operations shortens the overall shift time. However, the second conventional control device has drawbacks in that the synchronizer requires a relatively long synchronization time, due to large relative rotation which results from a great change in gear ratio and in that when the synchronization time of the synchronizer is shortened, a larger load acts on the synchronizer, adversely affecting the service life of the synchronizer.

In order to reduce the load, the second conventional control device for an automatic transmission may prolong the shift time through a reduction in shift speed. However, in this case, the second conventional control device encounters a problem that the efficiency becomes lower than that achieved by the first control device.

SUMMARY OF THE INVENTION

It is a general object of the present invention to provide a control device and a control method for an automatic transmission for automatically shifting a synchromesh type gear transmission which achieves reducing the load acting on the synchronizer to thereby increase service life and decreasing the number of shift operations to thereby shorten the overall shift time.

It is another object of the present invention to provide a control device for an automatic transmission for automatically shifting a synchromesh type gear transmission in which when shifting from a certain gear to another gear is effected while skipping an intermediate gear, the shifting is performed after temporary synchronization is effected by use of a synchronizer of the intermediate gear.

It is still another object of the present invention to provide a control device for an automatic transmission for automatically shifting a synchromesh type gear transmission, which comprises a controller in which shifting to another gear is performed after temporary synchronization is effected by use of a synchronizer of an intermediate gear between one gear and the another gear, when shifting from the one gear to the another gear while skipping at least a next gear of the one gear is effected.

It is a further object of the present invention to provide a control device for an automatic transmission for automatically shifting a synchromesh type gear transmission in which the skip shift is judged through detection of a shift instruction.

It is a still further object of the present invention to provide a control device for an automatic transmission for automatically shifting a synchromesh type gear transmission, in which the skip shift is judged through comparison between the one gear and the another gear based on the detected shift instruction.

It is a further object of the present invention to provide a control device for an automatic transmission for automatically shifting a synchromesh type gear transmission, in which the temporary synchronization by means of the synchronizer of an intermediate gear is realized through partial synchronization of the synchronizer of the intermediate gear.

It is a still further object of the present invention to provide a control device for an automatic transmission for automatically shifting a synchromesh type gear transmission, in which the temporary synchronization by means of the synchronizer of the intermediate gear is partial synchronization which is realized through adjustment of the load for engagement of the synchronizer of the intermediate gear.

It is a yet further object of the present invention to provide a control device for an automatic transmission for automatically shifting a synchromesh type gear transmission, in which the partial synchronization is half of ordinary synchronization performed during shifting.

It is a yet further object of the present invention to provide a control device for an automatic transmission for automatically shifting a synchromesh type gear transmission, in which when two or more intermediate gears between the present gear and the another gear are to be skipped during the skip shift, the intermediate gear which is closer or closest to the center in terms of gear ratio is selected, and the temporary synchronization is performed by use of the synchronizer of the selected intermediate gear.

It is a yet further object of the present invention to provide a control method for an automatic transmission for automatically shifting a synchromesh type gear transmission, wherein when shifting from a certain gear to another gear while skipping an intermediate gear is effected, the shifting to the another gear is performed after temporary synchronization is effected by use of a synchronizer of the intermediate gear.

The present invention provides an automatic transmission for automatically shifting a synchromesh-type gear transmission wherein comprises a controller in which shifting to another gear is performed after temporary synchronization is effected by use of a synchronizer of an intermediate gear between one gear and the another gear, when shifting from the one gear to the another gear while skipping at least a next gear of the one gear is effected. Therefore, the present invention achieves the effect of reducing the load acting on the synchronizer to thereby increase service life and the effect of decreasing the number of shift operations to thereby shorten the overall shift time.

In the present invention, the skip shift is judged through detection of a shift instruction. Therefore, the present invention achieves the effect of the skip shift being judged easily.

In the present invention, the skip shift is judged through comparison between the one gear and the another gear based on the detected shift instruction. Therefore, the present invention achieves the effect such that the synchronizer of an intermediate gear to undergo temporary synchronization is selected reliably.

In the present invention, since the temporary synchronization by means of the synchromesh mechanism of the intermediate gear is realized through partial synchronization of the synchromesh mechanism of the intermediate gear, the transmission is shifted to the another gear after the relative rotation has been reduced reliably. Therefore, the present invention achieves the effect of mitigating load acting on the synchronizer to thereby increase service life.

In the present invention, since the temporary synchronization by means of the synchromesh mechanism of an intermediate gear is partial synchronization which is realized through adjustment of the load for engagement of the synchromesh mechanism of the intermediate gear, the transmission is shifted to the another gear after the relative rotation has been reduced to a proper level. Therefore, the present invention achieves the effect of mitigating load acting on the synchronizer to thereby increase service life.

In the present invention, since the partial synchronization is half the synchronization performed during ordinary shifting, the transmission is shifted to the another gear after the relative rotation has been reduced to a proper level which is half the relative rotation encountered during ordinary shifting. Therefore, the present invention achieves the effect of mitigating load acting on the synchronizer to thereby increase service life.

In the present invention, when two or more intermediate gears between the one(present) gear and the another gear are to be skipped during the skip shift operation, the intermediate gear which is closer or closest to the center in terms of gear ratio is selected, and the temporary synchronization is performed by use of the synchromesh mechanism of the selected intermediate gear. Therefore, the transmission is shifted to the another gear after the relative rotation has been reduced to a practical and optimal level. Thus, the present invention achieves the effect of restraining load acting on the synchronizer to thereby increase service life.

DETAILED DESCRIPTION OF THE PREFERRED EMBODIMENTS

An embodiment of the present invention will be described with reference to the drawings.

Figure 1:
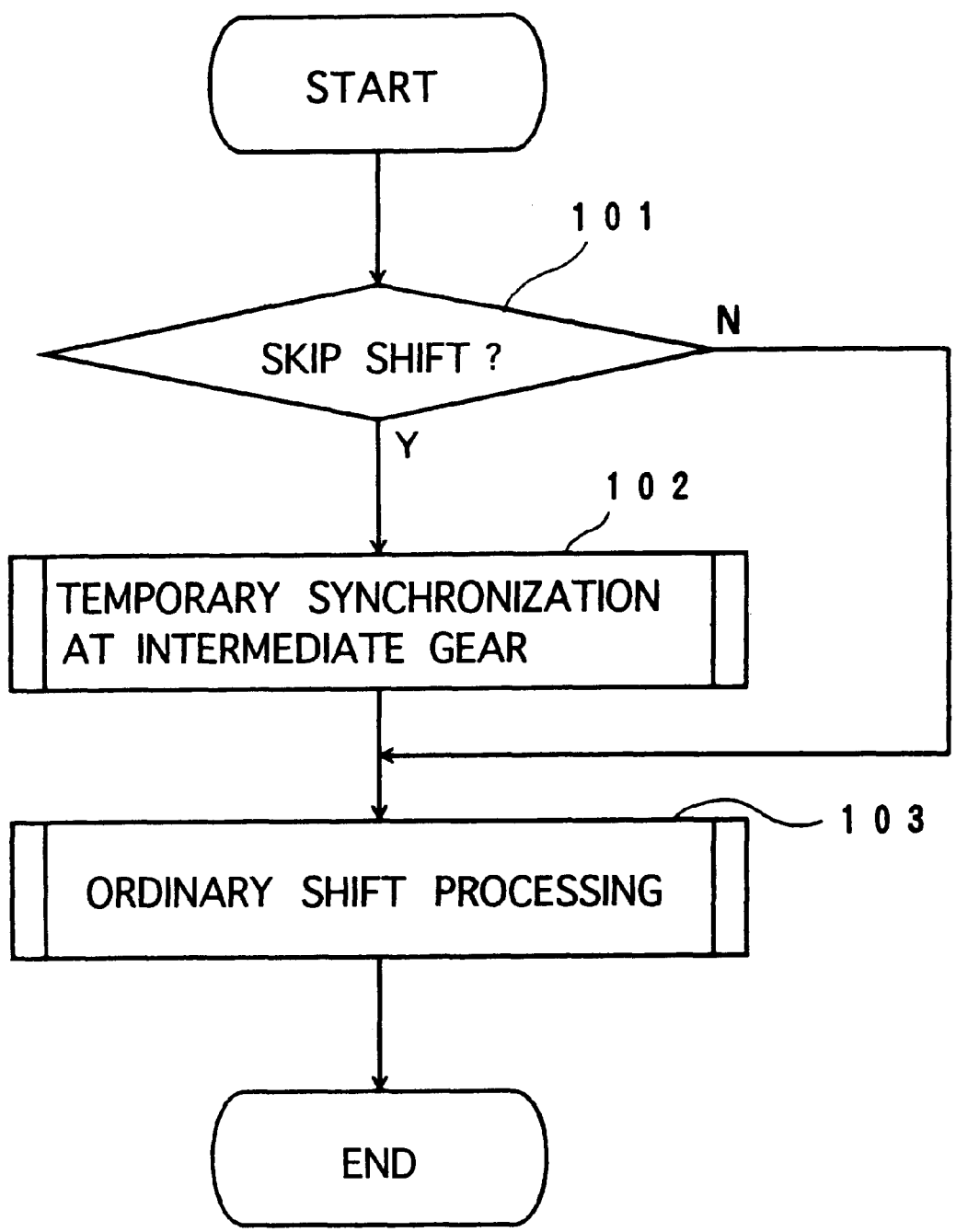
FIG. 1 is a flowchart showing the control flow of the control device for the automatic transmission according to the embodiment of the present invention.
Figure 2:
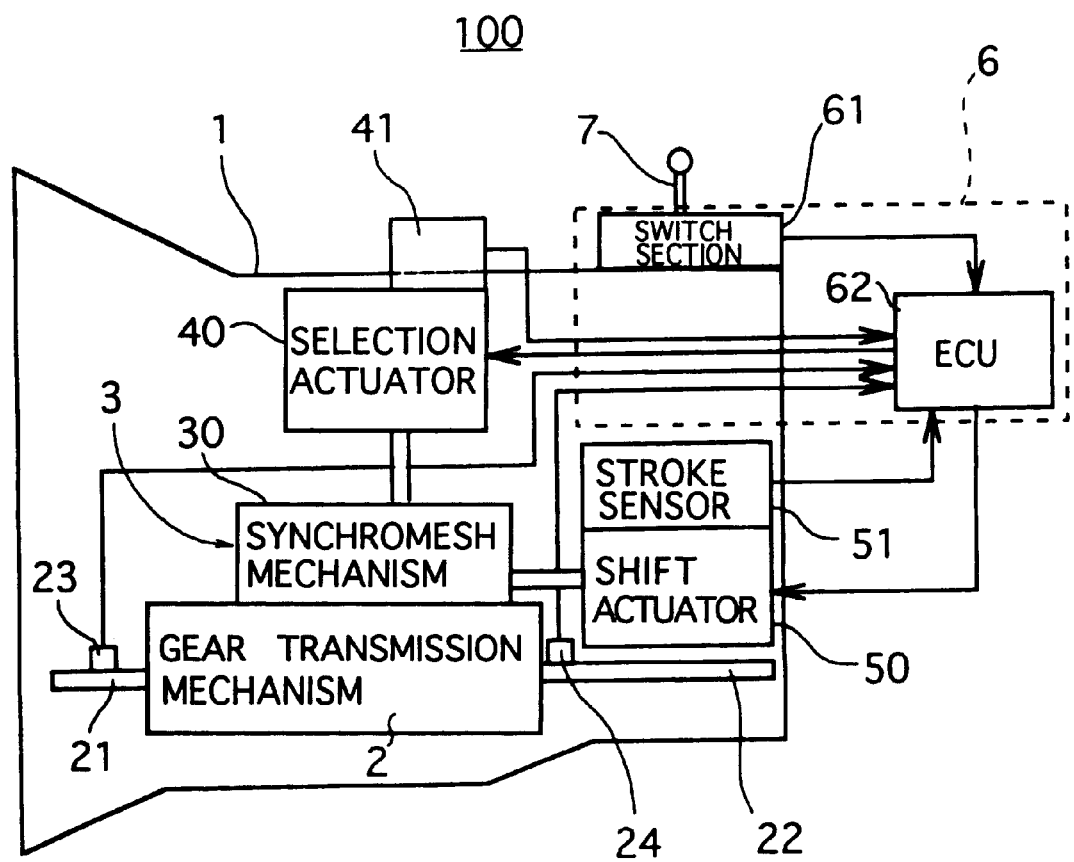
FIG. 2 is a block diagram showing the system configuration of the control device for the automatic transmission according to the embodiment.

FIGS. 1 to 8 shows a control device for an automatic transmission according to the present embodiment; i.e., a control device 6 for an automatic transmission 100 for automatically shifting a synchromesh-type gear transmission 2 shown in FIG. 2. The control device 6 is configured in such a manner that when it is judged, through detection of a shift instruction and through comparison between the present gear and another gear based on the shift instruction, that the shifting to another gear constitutes a skip shift for shifting the gear position from the one gear to the another gear while skipping an intermediate gear, the shifting to the another gear is performed after temporary synchronization is effected by use of a synchronizer of the intermediate gear, which constitutes a synchronization apparatus 3.

FIG. 2 schematically shows an exemplary hardware structure of an automatic transmission according to the present embodiment. The automatic transmission shown in FIG. 2 comprises the gear transmission mechanism 2 accommodated within a transmission casing 1; a synchromesh mechanism 30 which switches the combination of meshed gears (transmission state) of the gear transmission mechanism 2; a selection actuator 40 and a shift actuator 50 for electrically driving the synchromesh mechanism 30; and the control device 6 for controlling the actuators 40 and 50.

The control device 6 drives the actuators 40 and 50 in accordance with signals from a manual member 7, such as a switch or lever. The control device 6 is realized by an ECU 62 or a like which controls electric motors constituting the actuators 40 and 50.

As detection means, there are provided stroke sensors 41 and 51 for detecting the positions of the actuators 40 and 50, an input-shaft rotation sensor 23 for detecting rotational speed of an input shaft 21, and an output-shaft rotation sensor 24 for detecting rotational speed of an output shaft 22. Detection signals from these sensors are input to the ECU 62.

The automatic-operation transmission shown in FIG. 2 is assumed to use a manual transmission. The gear transmission mechanism 2 of such a manual transmission is set (or shifted) to have one of predetermined gear ratios through changing the transmission state of a constant-mesh gear train disposed on the input shaft 21 and the counter/output shaft (driven shaft) 22, by use of the synchromesh mechanism 30, which constitutes the synchronization apparatus 3 and serves as an operation mechanism.

Figure 3:
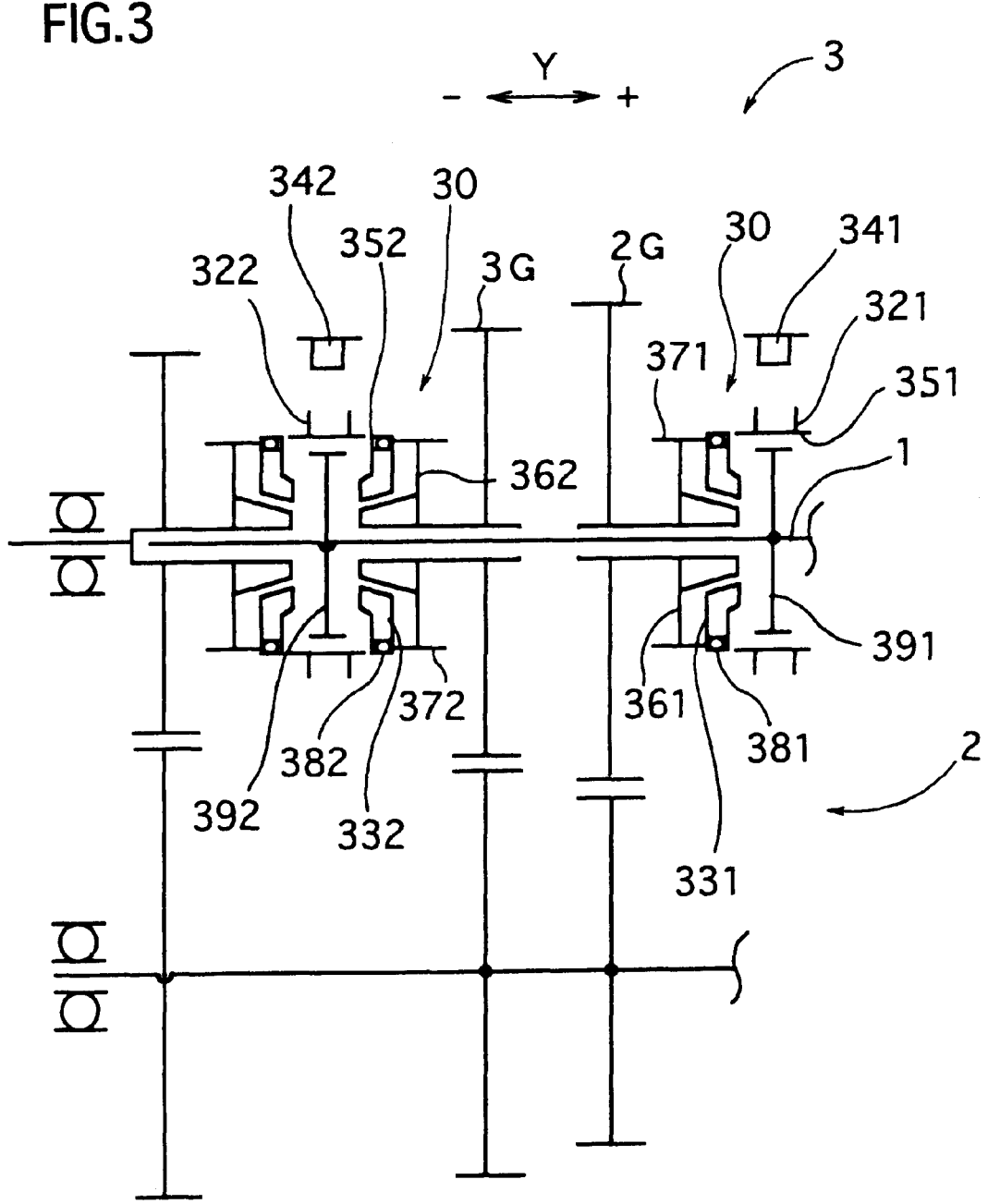
FIG. 3 is a structural diagram showing the synchromesh mechanism of the automatic transmission according to the embodiment of the present invention.

The operation mechanism is mainly composed of synchromesh mechanisms, in which relative braking is effected between cone friction surfaces. More specifically, as shown in FIG. 3, the synchromesh mechanisms 30 comprises respective synchronizer rings 331 and 332; and shift forks 341 and 342 which are respectively engaged with sleeves 321, 322 and splines 351, 352 of the synchromesh mechanisms 30.

Dog teeth 371 and 372 are formed on the outer circumferential portions of gear pieces 361 and 362 which face the synchronizer rings 331 and 332, respectively. Further, external teeth 381 and 382 are formed on the outer circumferential portions of the synchronizer rings 331 and 332, respectively; and clutch hubs 391 and 392 are disposed to face the sleeves 321 and 322, respectively.

The vehicle speed detection means for detecting vehicle speed comprises the output shaft rotation sensor 24 connected to the ECU 62, which constitutes the control device 6.

Figure 4:
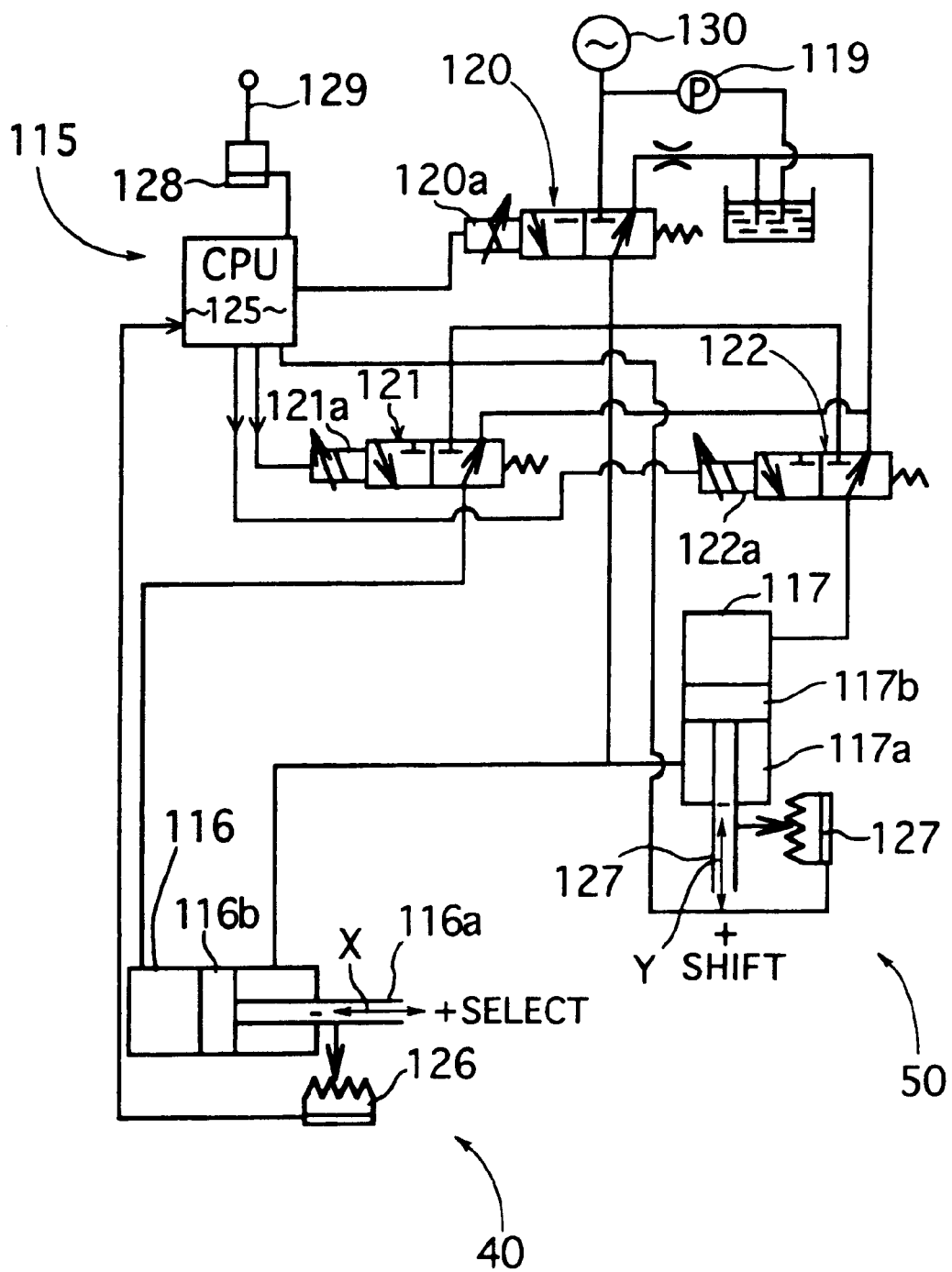
FIG. 4 is a block circuit diagram relating to the present embodiment and showing the control device for the selection actuator and the shift actuator.

The selection actuator 40 and the shift actuator 50 will now be described in detail with reference to FIG. 4.

On the basis of a detection signal output from a sensor 128 for detecting movement of a lever 129, a control device 115 constituted by a CPU 125 outputs control signals to valves described below. A pump 119 takes oil in from a reservoir and supplies pressurized oil, which is accumulated in an accumulator 130 and is supplied to a master valve 120.

In accordance with control signals output from the control device 115, the master valve 120 supplies the pressurized oil, which is supplied from the pump 119, selectively to a selection flow control valve 121 and a shift flow control valve 122.

On the basis of the control signals output from the control device 115, the selection flow control valve 121 controls, through action of a solenoid 121*a*, the supply direction and flow rate of the pressurized oil, which is supplied from the pump 119, to the left and right chambers of a linear-motion cylinder 116 corresponding to the moving direction of a piston 116*b* and a rod 116*a* thereof. The linear-motion cylinder 116 constitutes the above-mentioned selection actuator 40.

On the basis of the control signals output from the control device 115, the shift flow control valve 122 controls, through action of a solenoid 122*a*, the supply direction and flow rate of the pressurized oil, which is supplied from the pump 119, to the left and right chambers of a linear-motion cylinder 117 corresponding to the moving direction of a piston 117*b* and a rod 117*a* thereof. The linear-motion cylinder 117 constitutes the above-mentioned shift actuator 50.

The amount of movement X of the rod 116*a* and the amount of movement Y of the rod 117*a* are detected by means of position sensors 126 and 127, respectively.

Temporary synchronization control and synchronization control which are performed during skip shift by the control device 6 according to the first embodiment will be described with reference to the flowcharts shown in FIG. 1 and FIGS. 6 to 8.

In step 101 of the flowchart in FIG. 1, the present gear position is compared with another gear position based on the detected shift instruction, and a judgment is made as to whether the shifting from the present gear to the another gear constitutes skip shift in which a shifting operation is performed while an intermediate gear is skipped.

When in step 101 it is judged that the shifting from the present gear to the another gear constitutes skip shift, in step 102 temporary synchronization is performed at the intermediate gear between the present gear and the another gear to thereby decrease the relative rotational-speed difference between the input shaft 21 and the output shaft 22.

When two or more intermediate gears between the present gear and the another gear are to be skipped during the skip shift, the intermediate gear which is closer or closest to the center in terms of gear ratio is selected as the intermediate gear for which temporary synchronization is performed in step 102, and the temporary synchronization is performed by the synchronizer of the selected intermediate gear.

In step 103, ordinary shift processing is performed at the another gear based on the shift instruction.

An exemplary skip shift operation in which shifting from $5^{th}$ gear to $3^{rd}$ gear while skipping $4^{th}$ gear is performed as illustrated by a solid line in the shift pattern shown in FIG. 5 will be described further with reference to FIG. 6.

Figure 5:
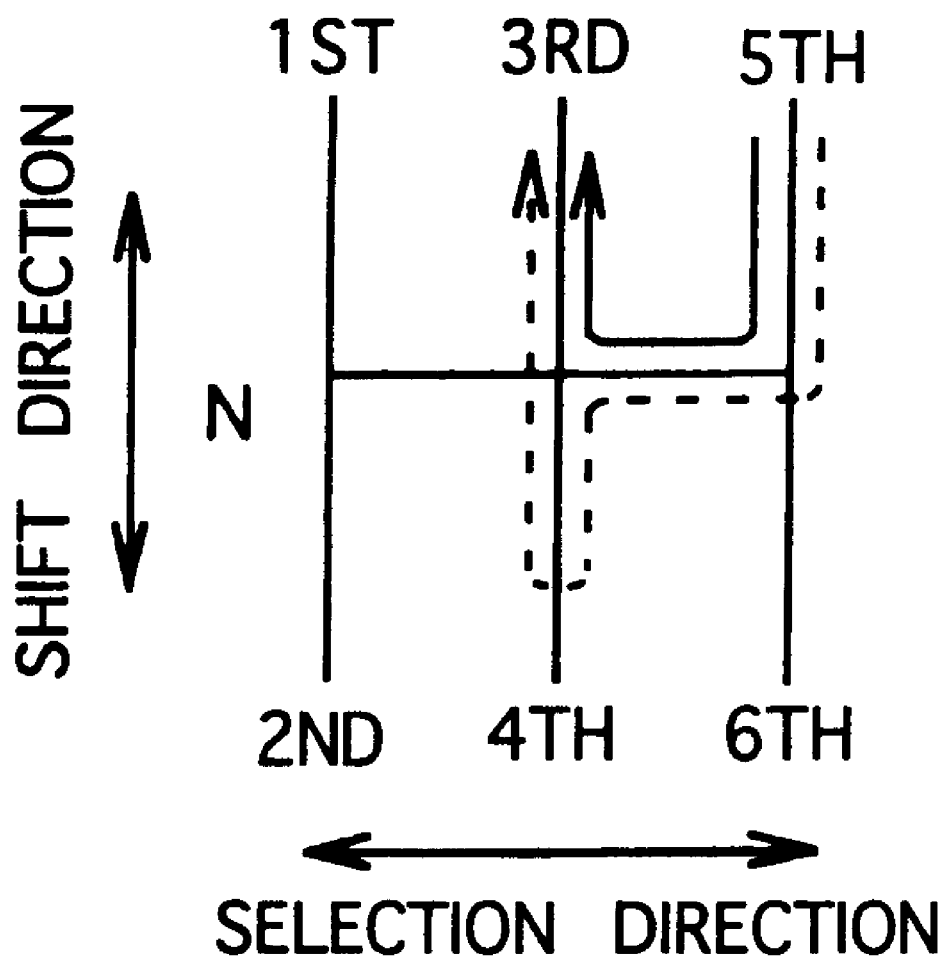
FIG. 5 is a explanatory illustration relating to the embodiment and showing the shift positions and directions of the shift mechanism.
Figure 6:
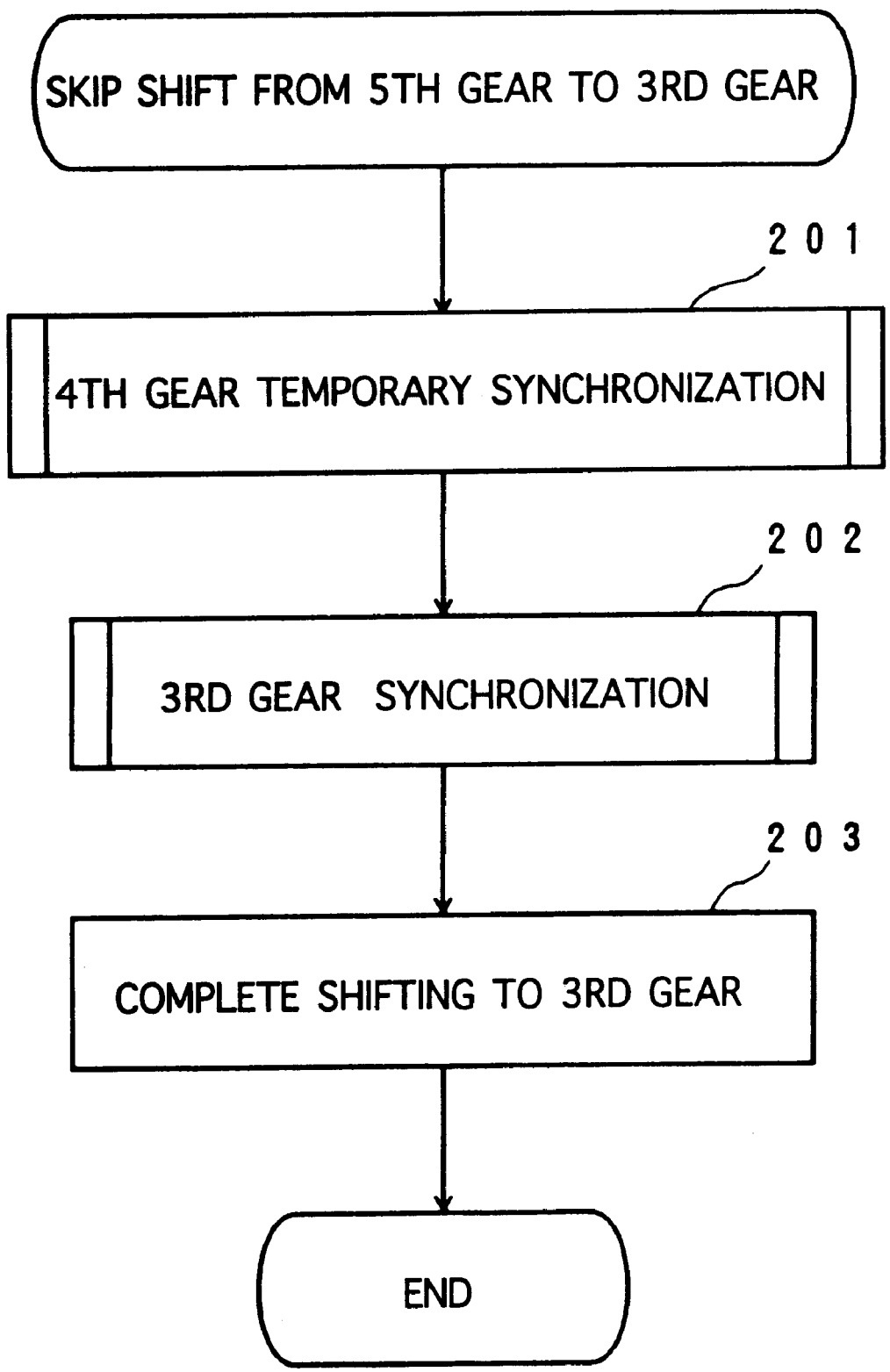
FIG. 6 is a flowchart relating to the embodiment and showing an exemplary control flow for the case in which skip shift from $5^{th}$ gear to $3^{rd}$ gear is performed.

In step 201, temporary synchronization at $4^{th}$ gear is performed as indicated by a broken line in FIG. 5 to thereby decrease the relative rotational-speed difference between the input shaft 21 and the output shaft 22.

After the relative rotational-speed difference between the input shaft 21 and the output shaft 22 has been reduced through the temporary synchronization by the synchronizer of $4^{th}$ gear, in step 202, synchronization at $3^{rd}$ gear is performed, and in step 203, an operation to be performed after the synchronization at $3^{rd}$ gear is performed continuously to thereby complete the shifting to $3^{rd}$ gear. Then, the processing ends.

Figure 7:
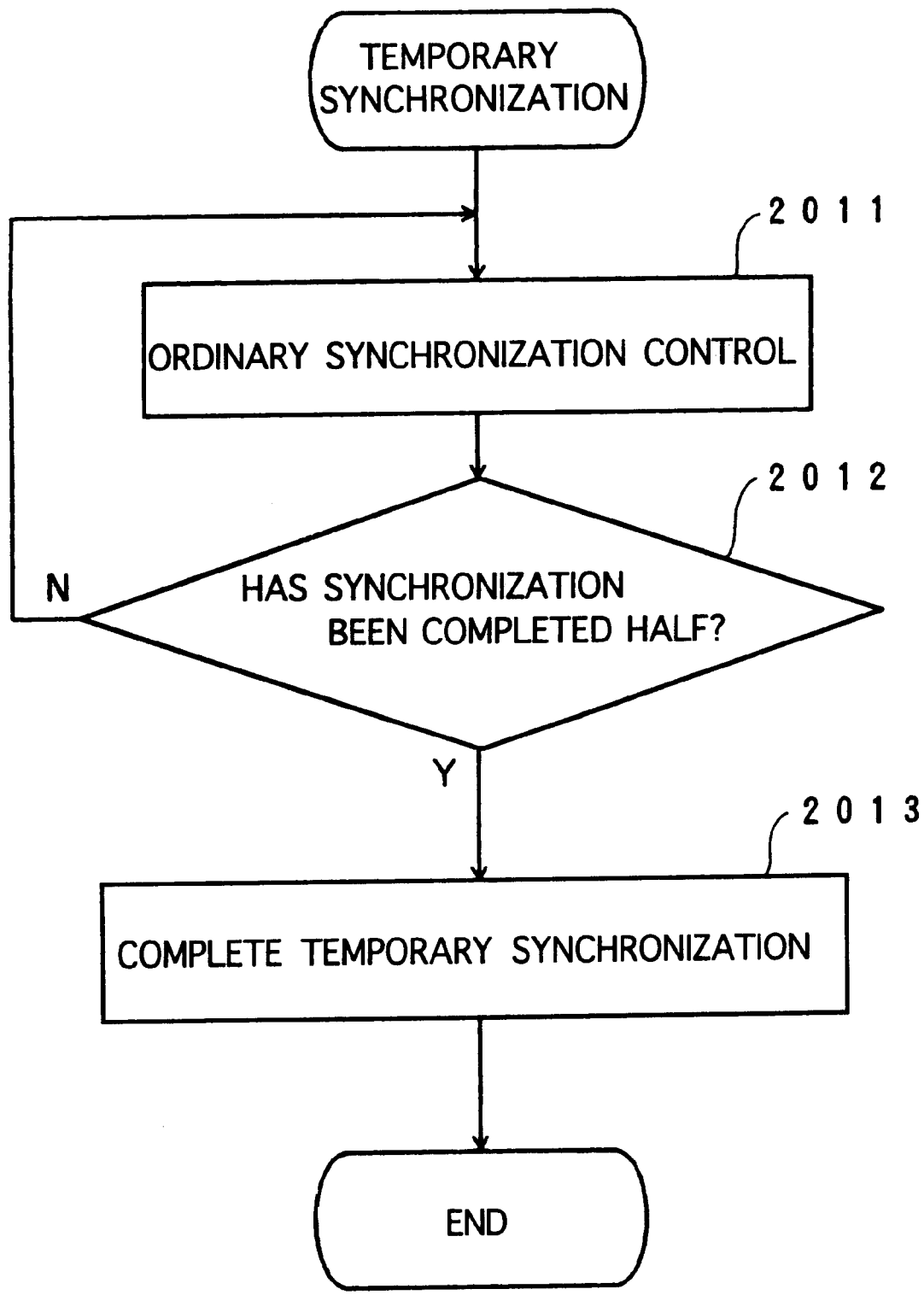
FIG. 7 is a flowchart relating to the embodiment and showing the detailed procedures of the temporary synchronization step in the flowchart of FIG. 6.

The temporary synchronization in step 201 will be described in more detail with reference to FIG. 7.

In step 2011, an ordinary synchronization control operation, which has been conventionally employed, is performed halfway; i.e., the partial synchronization is established through adjustment of load for engagement of the synchronizer of the intermediate gear.

When in step 2012 it is judged that the ordinary synchronization operation has been completed halfway, in step 2013 temporary synchronization is judged to have been completed. Then, the processing ends.

Figure 8:
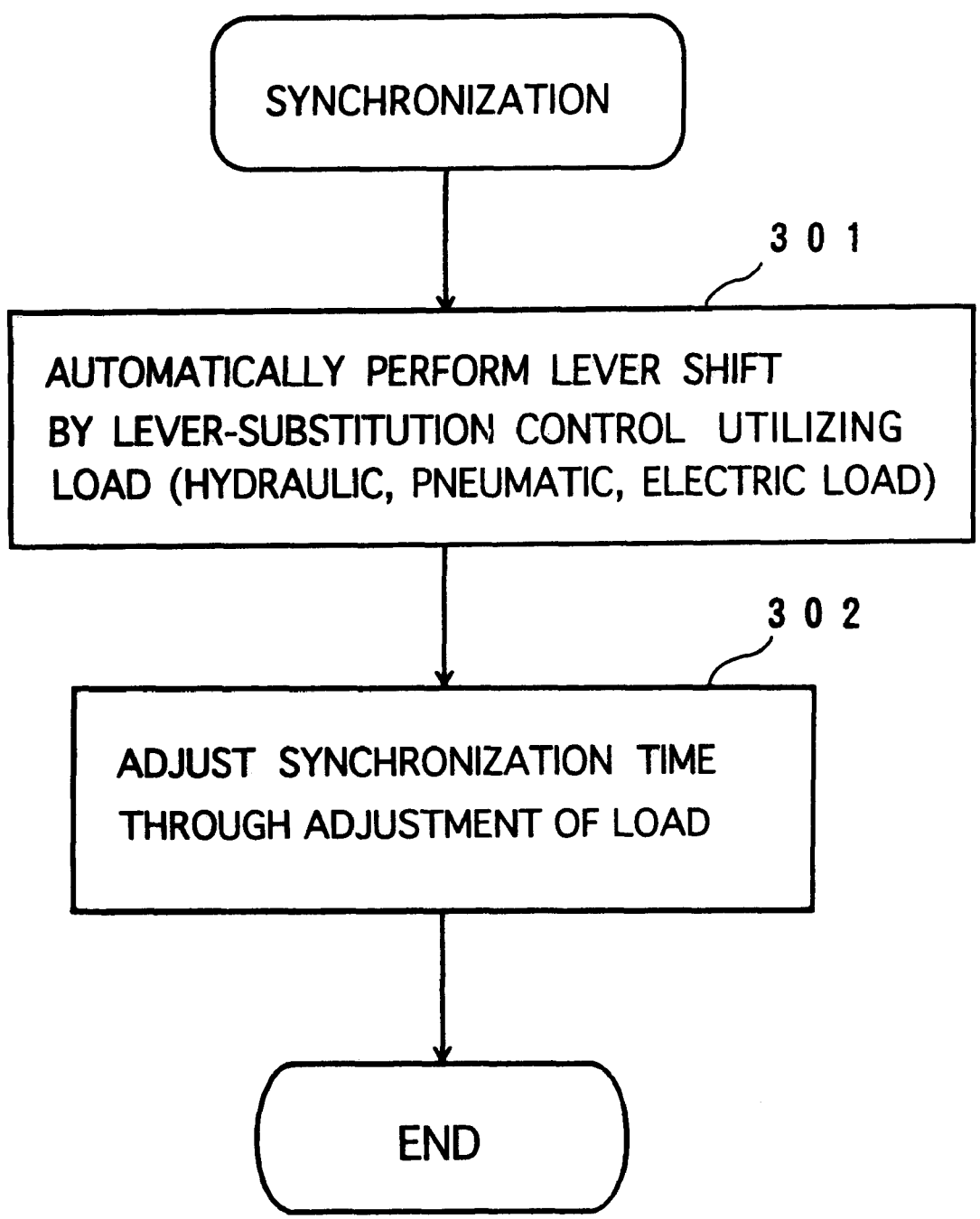
FIG. 8 is a flowchart relating to the embodiment and showing the detailed procedures of the synchronization step in the flowchart of FIG. 6.

Synchronous control for matching the input rotation with the product of the gear ratio and the output rotation will be described in more detail with reference to FIG. 8.

In step 301, an automatic lever shift operation is effected by lever-substitution control utilizing load (hydraulic, pneumatic, or electric load).

In step 302, the synchronization time is adjudged through adjustment of load. Then, the processing ends. An excessively high load shortens the life of the transmission (synchronizer), whereas an excessively low load prolongs the shift time, resulting in deteriorated shift feeling.

Figure 9:
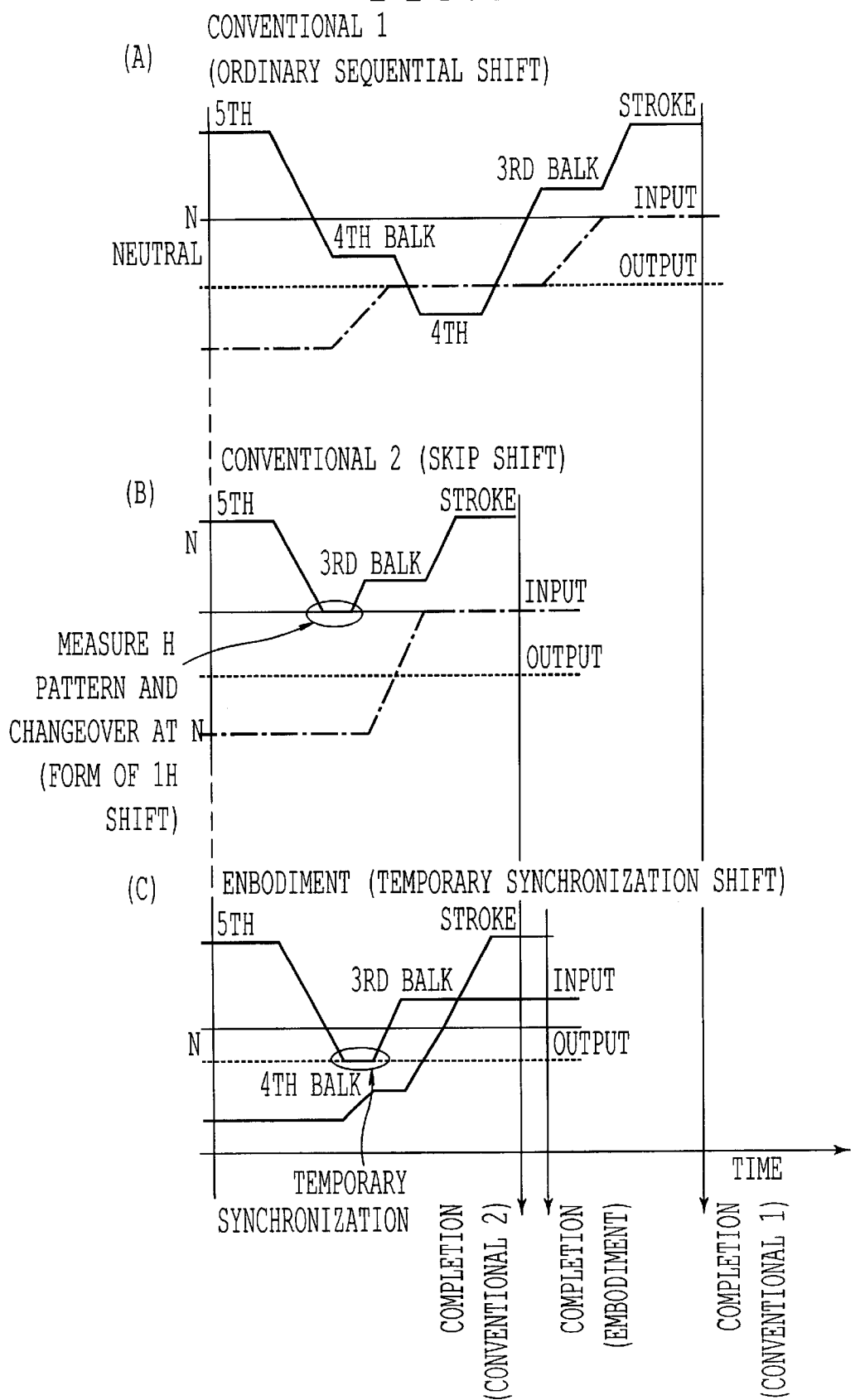
FIG. 9 is a diagram showing variation in shift stroke as well as variations in input and output rotations during skip shift for each of the automatic transmission control device according to the present invention, the first conventional automatic transmission control device, and the second conventional automatic transmission control device.

As shown in FIG. 9(C), the control device for an automatic transmission according to the present operates the fork to thereby cause the $4^{th}$-gear synchronizer to effect temporary synchronization in order to increase the rotational speed of the input shaft 21. Through this operation, the relative rotational-speed difference between the input shaft 21 and the output shaft 22 is lowered.

After the relative rotational-speed difference between the input shaft 21 and the output shaft 22 has been lowered, through operation of the fork, $3^{rd}$-gear synchronization is effected by the $3^{rd}$-gear synchronizer in order to increase the rotational speed of the input shaft 21. Thus, the input rotation is matched with the product of the gear ratio and the output rotation.

The operation to be performed after the $3^{rd}$-gear synchronization is performed continuously to thereby complete the shifting operation to $3^{rd}$ gear. Then, the processing ends.

In the above-described control device for an automatic transmission according to the present embodiment, when a skip shift operation from a certain gear (e.g., $5^{th}$ gear) to another gear (e.g., $3^{rd}$ gear) is performed while an intermediate gear (e.g., $4^{th}$ gear) is skipped, the transmission is shifted to the another gear (e.g., $3^{rd}$ gear) after the temporary synchronization is effected by means of a synchronizer ring of the intermediate gear (e.g., $4^{th}$ gear). Therefore, the control device for an automatic transmission according to the present invention achieves the effect of mitigating load acting on and damage to the synchronizer ring to thereby increase service life.

Since the control device for an automatic transmission according to the first embodiment only performs temporary synchronization by means of the synchronizer ring of the intermediate gear (e.g., $4^{th}$ gear), the number of shift operations can be decreased in order to shorten the overall shift time, as shown in FIG. 9(C).

The above-described skip shift is performed when the vehicle travels on a mountainous road in an automatic gear-shift mode. If the vehicle travels in $4^{th}$ gear when encountering an upslope, a larger torque is required, so that a gear-shift instruction that instructs shifting to $2^{nd}$ gear is issued. In this case, the transmission is shifted from $4^{th}$ gear to $3^{rd}$ gear and then from $3^{rd}$ gear to $2^{nd}$ gear in accordance with the procedures of the present embodiment, whereby a shift operation suitable for a driver's preference is realized, while no load is applied to the manual transmission.

Further, in the control device for an automatic transmission according to the present embodiment, since a skip shift operation is judged to be instructed through detection of a shift instruction, the judgment of the skip shift is effected easily.

Further, in the control device for an automatic transmission according to the present embodiment, since the skip shift operation is judged through comparison between the present gear and the another gear based on the detected shift instruction, the synchronizer ring of an intermediate gear (e.g., $4^{th}$ gear) to undergo temporary synchronization is selected reliably.

Further, in the control device for an automatic transmission according to the present embodiment, since the temporary synchronization by means of the synchronizer ring of an intermediate gear (e.g., $4^{th}$ gear) is realized through partial synchronization of the synchronizer ring of the intermediate gear, the transmission is shifted to the another gear after the relative rotation has been reduced reliably. Therefore, the effect of mitigating load acting on the synchronizer ring to thereby increase service life is attained.

Figure 10:
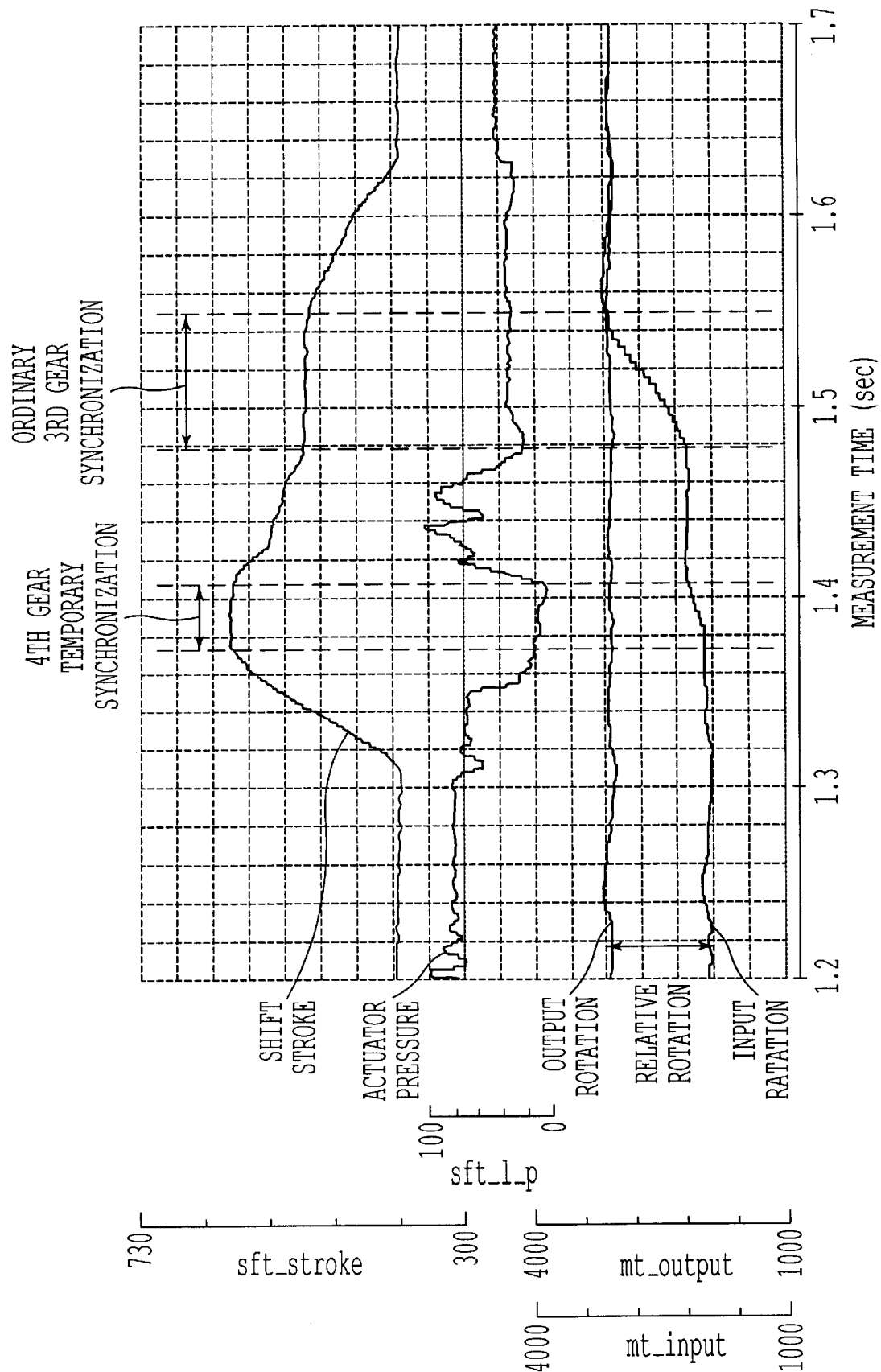
FIG. 10 is a diagram relating to the embodiment and showing actually measured variations in shift stroke, relative rotation between the input and output shafts, and actuator pressure during skip shift from $5^{th}$ gear to $3^{rd}$ gear.
Figure 11:
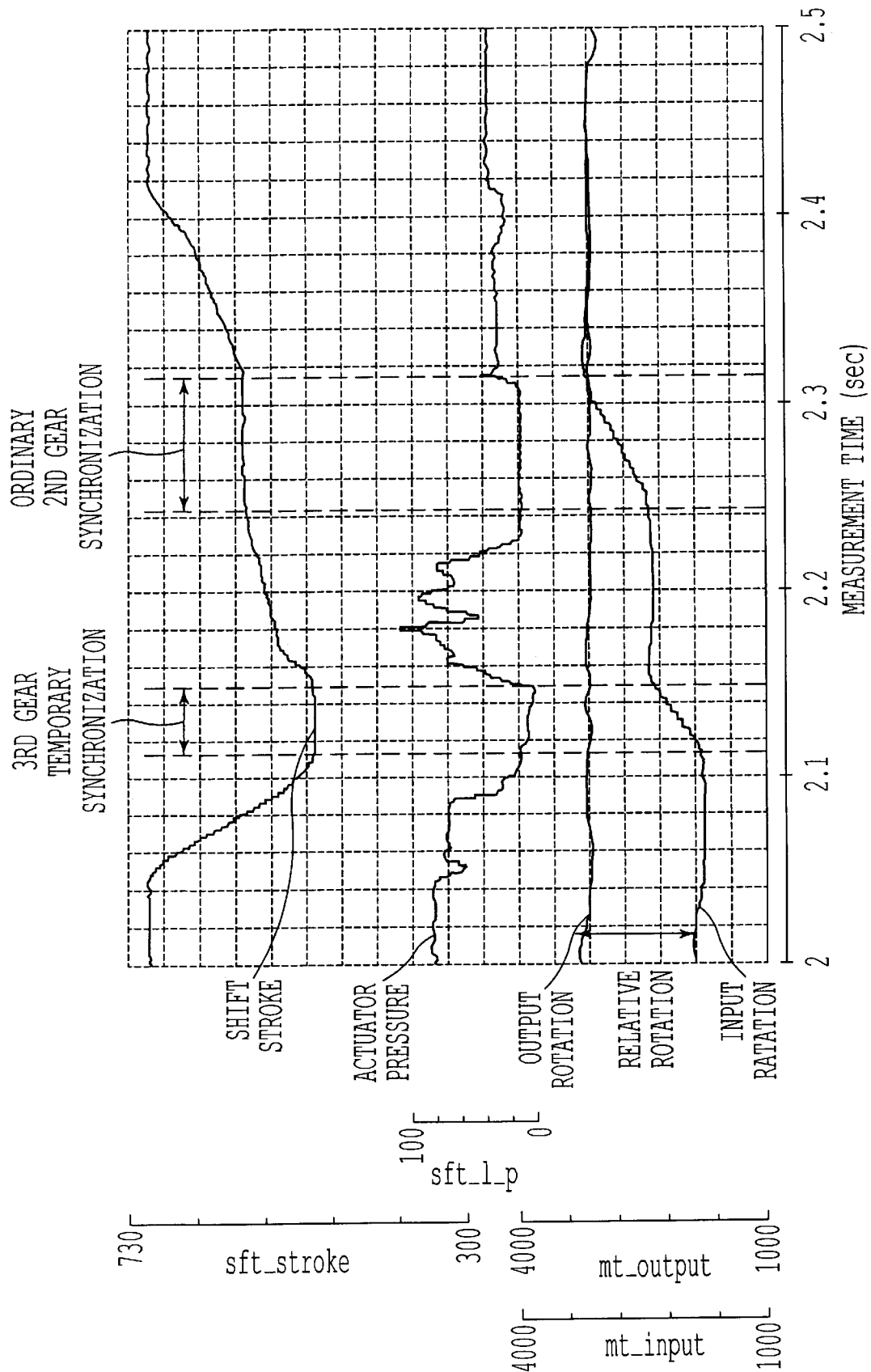
FIG. 11 is a diagram relating to the embodiment and showing actually measured variations in shift stroke, relative rotation between the input and output shafts, and actuator pressure during skip shift from $4^{th}$ gear to $2^{nd}$ gear.
Figure 12:
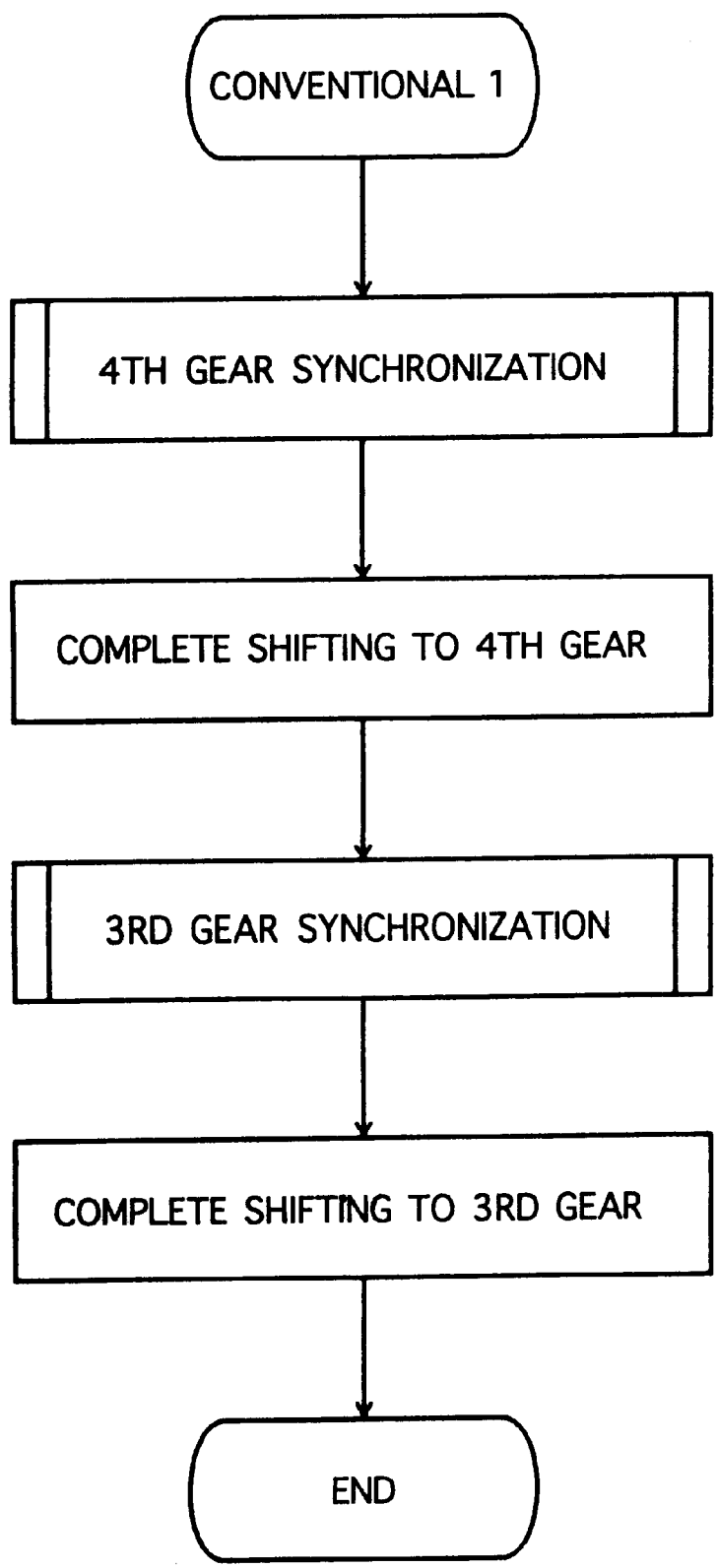
FIG. 12 is a flowchart showing an exemplary control flow of the first conventional apparatus for the case when sequential sifting is performed from $5^{th}$ gear to $3^{rd}$ gear via $4^{th}$ gear.
Figure 13:
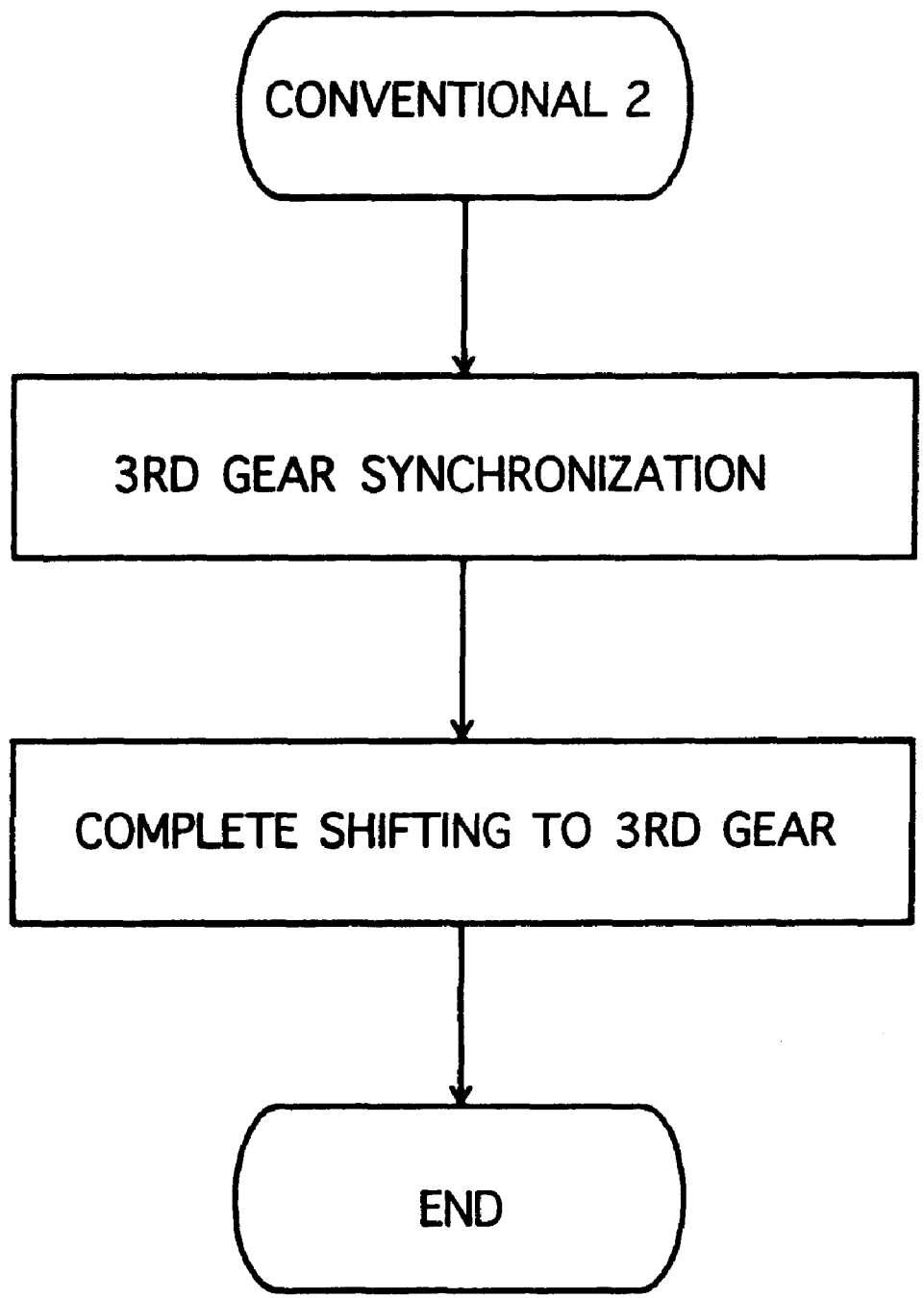
FIG. 13 is a flowchart showing an exemplary control flow of the second conventional apparatus for the case when skip shift is performed from $5^{th}$ gear to $3^{rd}$ gear.

FIG. 10 shows actual measurement data for the case in which skip shift from $5^{th}$ gear to $3^{rd}$ gear was performed, and FIG. 11 shows actual measurement data for the case in which skip shift from $4^{th}$ gear to $2^{nd}$ gear was performed. As is apparent from variation in shift stroke, variation in relative rotation between the input shaft and the output shaft, and variation in actuator pressure during temporary synchronization at the intermediate gear ($4^{th}$ gear, $3^{rd}$ gear) shown in FIGS. 10 and 11, a large increase in actuator pressure during temporary synchronization ($4^{th}$ gear, $3^{rd}$ gear) can be avoided.

Further, in the control device for an automatic transmission according to the present embodiment, since the temporary synchronization by means of the synchronizer ring of an intermediate gear (e.g., $4^{th}$ gear) is partial synchronization which is realized through adjustment of the load for engagement of the synchronizer ring of the intermediate gear, the transmission is shifted to the another gear after the relative rotation has been reduced to a proper level. Therefore, the effect of mitigating load acting on the synchronizer ring to thereby increase service life is attained.

Further, in the control device for an automatic transmission according to the present embodiment, since the partial synchronization is half the synchronization performed during ordinary shifting, the transmission is shifted to the another gear after the relative rotation has been reduced to a proper level which is half the relative rotation encountered during ordinary shifting. Therefore, the effect of mitigating load acting on the synchronizer ring to thereby increase service life is attained.

Further, in the control device for an automatic transmission according to the present embodiment, when two or more intermediate gears between the present gear and the another gear are to be skipped during the skip shift operation, the intermediate gear which is closer or closest to the center in terms of gear ratio is selected, and the temporary synchronization is performed by use of the synchronizer ring of the selected intermediate gear. Therefore, the transmission is shifted to the another gear after the relative rotation has been reduced to a practically optimal proper level, whereby the effect of mitigating load acting on the synchronizer ring to thereby increase service life is attained.

In the above-described embodiment, a system which utilizes the synchronizer of a manual transmission has been described as an example. However, clutch control and engine control may replace the synchronizer of the manual transmission.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

That is, when the input and output of the manual transmission are not connected (when the manual transmission is in a neutral state), the input rotational speed is rendered close to the output rotational speed though engine or clutch control for shift operation.

What is claimed is:

1. A control device for an automatic transmission for automatically shifting a synchromesh type gear transmission, wherein comprises a controller in which shifting to another gear is performed after temporary synchronization is effected by use of a synchronizer of an intermediate gear between one gear and said another gear, when shifting from said one gear to said another gear while skipping at least a next gear of said one gear is effected.

2. A control device for an automatic transmission according to claim 1, wherein the skip shift is judged through detection of a shift instruction.

3. A control device for an automatic transmission according to claim 2, wherein the skip shift is judged through comparison between said one gear and said another gear based on said detected shift instruction.

4. A control device for an automatic transmission according to claim 1, wherein the temporary synchronization by means of said synchronizer of said intermediate gear is realized through partial synchronization of said synchronizer of said intermediate gear.

5. A control device for an automatic transmission according to claim 4, wherein the temporary synchronization by means of said synchronizer of said intermediate gear is partial synchronization which is realized through adjustment of the load for engagement of said synchronizer of said intermediate gear.

6. A control device for an automatic transmission according to claim 5, wherein the partial synchronization is half of ordinary synchronization performed during shifting.

7. A control device for an automatic transmission according to claim 6, wherein when two or more intermediate gears between said one gear and said another gear are to be skipped during the skip shift, said intermediate gear which is closer or closest to the center in terms of gear ratio is selected, and the temporary synchronization is performed by use of said synchronizer of said selected intermediate gear.

8. A control method for an automatic transmission for automatically shifting a synchromesh type gear transmission, wherein when shifting from a certain gear to another gear while skipping an intermediate gear is effected, the shifting to said another gear is performed after temporary synchronization is effected by use of a synchronizer of said intermediate gear.

* * * * *